(No Model.)
J. H. HANNEKEN & J. T. MAY.
GARDEN IMPLEMENT.
No. 509,308. Patented Nov. 21, 1893.
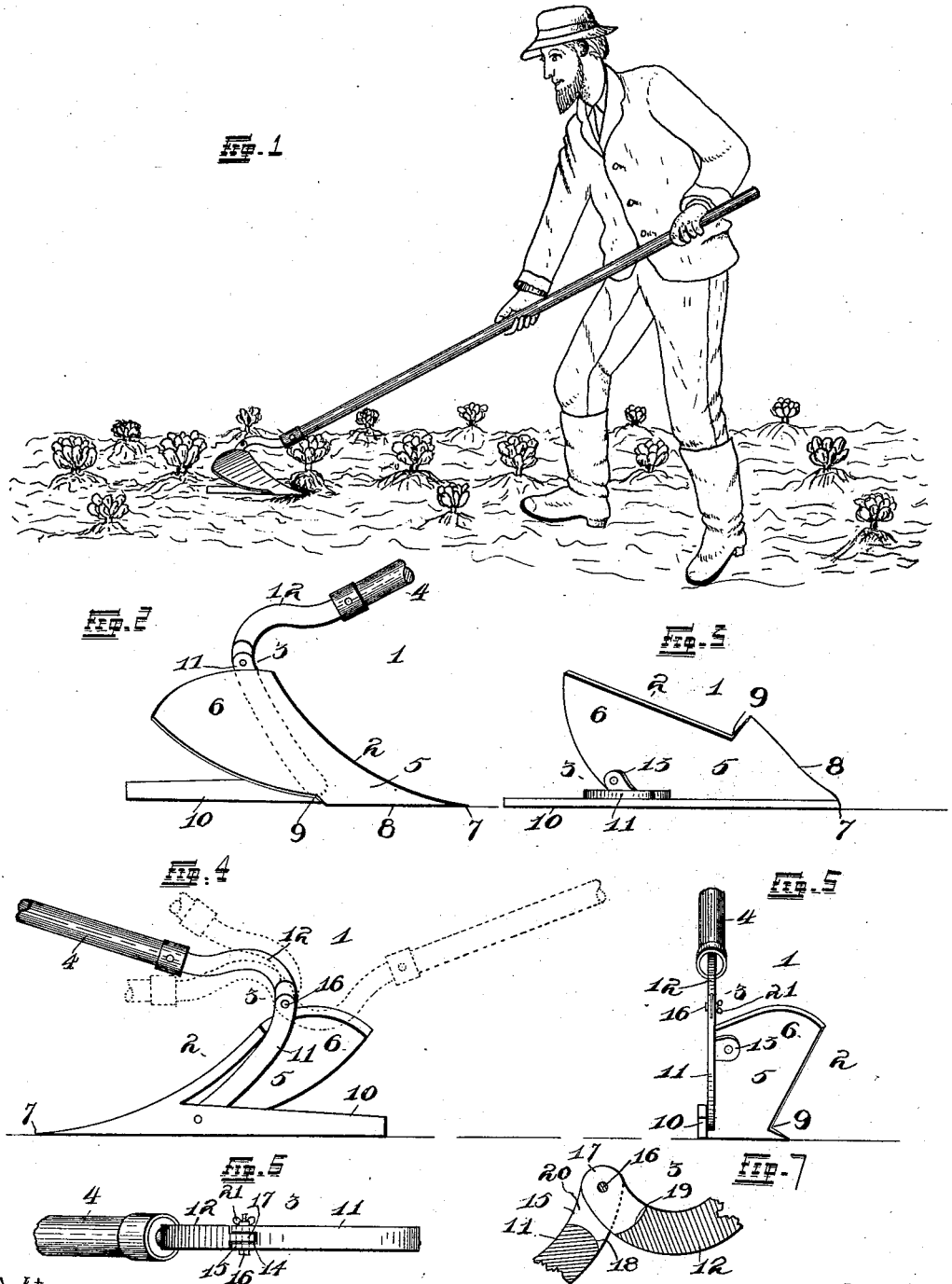

UNITED STATES PATENT OFFICE.

JOHN HENRY HANNEKEN AND JAMES THOMAS MAY, OF VILLA RIDGE, MISSOURI.

GARDEN IMPLEMENT.

SPECIFICATION forming part of Letters Patent No. 509,308, dated November 21, 1893.

Application filed May 29, 1893. Serial No. 475,967. (No model.)

*To all whom it may concern:*

Be it known that we, JOHN HENRY HANNEKEN and JAMES THOMAS MAY, of the city of Villa Ridge, county of Franklin, and State of Missouri, have invented certain new and useful Improvements in Garden Implements, of which the following is a full, clear, and exact description, reference being had to the accompanying drawings, forming a part hereof.
Our invention relates to an improvement in "garden implements," and refers particularly to that class of manufactured articles known as "hoes," the improvements in which are more fully hereinafter described and set forth in the claims.

The ordinary hoe for garden cultivation as now constructed is not applicable or handy for many kinds of gardening. In most instances it is necessary to give the implement some impetus to enter the soil, generally in the form of a downward stroke, in order that the blade will enter the soil, and at the same time enable the displacement of the same. We have therefore applied a blade somewhat resembling a plow-share in form and function, and combined therewith a number of features which render the construction more serviceable. The adjustable handle allows a change in the angle of the same to suit men of different heights, and also admits of the handle being entirely reversed for specific purposes as hereinafter set forth, at the same time retaining the handle in the line of leverage.

In the drawings:—Figure 1 is a view of a man using the device as constructed after the method of our invention. Fig. 2 is an enlarged side elevation of the blade and a portion of the handle, looking at the outer side of same. Fig. 3 is an enlarged inverted plan view of the blade showing particularly the means for attaching the handle. Fig. 4 is an enlarged side elevation of the blade, part of the handle, and several alternate positions of the handle under different circumstances.
Fig. 5 is an enlarged rear end elevation of the device, again showing the fastening of the handle. Fig. 6 is an enlarged detail top plan view of a portion of the handle showing the joint by means of which the same is adjustable to different positions. Fig. 7 is an enlarged detail sectional view of a portion of the jointed handle.

Referring to the drawings:—1 indicates our complete invention, which consists mainly of three parts: the share 2, a portion 3 of the handle, and the handle 4 itself. The portion 3 includes the means for connecting the share 2 with the pole 4 and has a peculiar construction as will be hereinafter described. The share 2 comprises a blade portion 5 which is of a peculiar form, to carry out certain functions contemplated in our invention. Said blade tapers from the broad elevated portion 6 at the rear to a forward pointed end 7, which presents a slightly curved side face 8 as shown in Fig. 3, said face 8 terminating in a cut-out portion 9 about mid-way from front to rear. The cut-out portion 9 has a function in that the soil is thrown back along the outer edge of the furrow thus covering the roots of the plants. The slope of the blade 5 is gradual from the upper rear edge, both toward the pointed end 7 and the side face 8. Extending back from the point 7 and with its lower edge in alignment with the edge 8 is a bar 10 which with said edge 8 serves to elevate the blade. The function of the bar 10 is to enable the formation of the furrow between two rows of plants or for seeding purposes. It also assists in the displacement of the soil to a uniform depth.

The portion 3 of the handle consists of two parts 11 and 12, the part 11 being slightly curvilinear in form and provided with a projecting lug 13 which is riveted to the under side of the blade 5, and together with the fastening of the lower end of the part 11 to the inner side of the bar 10 forms the securance of said handle. The upper end of the same is provided with a central slit 14 which forms two ears 15, both of which are perforated to receive a screw threaded hand-bolt 16 which also passes through a perforated lug 17 projecting from the free end of the handle portion 12. Figs. 6 and 7 show the construction of these parts in detail. The extremities of the ears 15 are rounded as are also the faces 18 and 19 presented respectively by the inner end of the slit 14 and the cut-out portions 20 each side of the lug 17.

The hand bolt 16 has a head upon one end and a thumb-nut 21 upon the other, which allow the locking of the handle at any desired angle.

The free end of the handle 12 is suitably secured in the pole 4 and completes the construction of our invention.

We will now detail the many advantages presented by the improvement and chief among these is the form of the blade which has a great deal to do toward furthering the successful operation of the implement. The curved edge 8 tapering into the pointed end 7 causes the displacement of the soil when the implement is drawn through the same. The shoulder formed by the cut-out portion 9 together with the gradual incline of the blade from the end to the same, causes the soil to be distributed along the edge of the furrow formed by the implement. The bar 10 acts as a guide in drawing the implement through the soil and also prevents the same from falling back into the furrow formed by the passage of the blade.

The adjustable feature of the invention is an important one involving as it does, the adaptability of the implement for ready use by men of different statures.

By means of the jointed construction of the handle it is possible to reverse the handle entirely as shown by the dotted lines in Fig. 4. In this way the handle is reversible to a point in which the line of leverage is retained and enables the pushing of the blade into the soil, adjacent fence corners, &c., which is not so easily done with other implements.

It is now thought that the device presents many new and novel features over other implements constructed especially for the hand cultivation of gardens, fields, &c.

Having fully described our invention, what we claim as new is—

1. An improved hand garden implement, consisting of a blade portion, a guide bar, and a handle, the latter formed in two parts adjustably connected together and carrying a lug adapted to be connected to the blade portion and also adapted to be reversed in relation to the blade, said handle being adapted to be secured to the guide bar; substantially as set forth.

2. In a hand garden implement, the combination, with the blade, the handle portion 11 having the ears 15, and the handle portion 12 having the lug 17 engaging between the ears 15, of a set screw passing through the ears 15 and lug 17 and adapted to retain them in any desired relation with respect to each other, substantially as set forth.

In testimony whereof we affix our signatures in the presence of two witnesses.

JOHN HENRY HANNEKEN.
JAMES THOMAS MAY.

Witnesses:
GEO. H. MERTEN,
R. L. SHEPPER.